(12) United States Patent
Calle et al.

(10) Patent No.: US 7,790,225 B1
(45) Date of Patent: Sep. 7, 2010

(54) COATINGS AND METHODS FOR CORROSION DETECTION AND/OR REDUCTION

(75) Inventors: Luz M. Calle, Merritt Island, FL (US); Wenyan Li, Orlando, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1296 days.

(21) Appl. No.: 11/239,445

(22) Filed: Sep. 19, 2005

(51) Int. Cl.
*B05D 7/00* (2006.01)
*B01J 13/02* (2006.01)
*B32B 25/00* (2006.01)
*B32B 27/00* (2006.01)
*B32B 27/02* (2006.01)
*C09D 151/00* (2006.01)
*C08K 9/00* (2006.01)
*A01N 25/00* (2006.01)
*C09K 3/14* (2006.01)
*C08L 95/00* (2006.01)
*C04B 14/00* (2006.01)

(52) U.S. Cl. ............ 427/212; 427/8; 427/213.3; 427/213.34; 427/213.35; 427/213.36; 428/402.2; 428/402.21; 428/402.22; 428/402.24; 428/403; 428/407; 523/205; 523/201; 523/200; 71/64.11; 106/36; 106/235; 106/241; 106/251; 106/266; 106/272; 106/275; 106/276; 106/280; 106/281.1; 106/400; 106/600; 106/789

(58) Field of Classification Search ............. 427/8; 428/402.2; 523/205, 201
See application file for complete search history.

(56) References Cited

U.S. PATENT DOCUMENTS

| | | | | |
|---|---|---|---|---|
| 4,273,671 | A | * | 6/1981 | Allinikov ............ 252/301.19 |
| 6,022,501 | A | * | 2/2000 | Dexter et al. ............ 264/4.7 |
| 6,075,072 | A | * | 6/2000 | Guilbert et al. ............ 523/200 |
| 6,080,334 | A | * | 6/2000 | Heimann et al. ........ 252/389.62 |
| 6,544,540 | B2 | | 4/2003 | Van Koppenhagen |
| 6,716,526 | B2 | * | 4/2004 | Weston et al. ............ 428/402.2 |
| 7,192,993 | B1 | * | 3/2007 | Sarangapani et al. ........ 523/200 |
| 2002/0081431 | A1 | * | 6/2002 | Schmdt ............ 428/402 |
| 2003/0068824 | A1 | | 4/2003 | Frankel et al. |
| 2005/0176851 | A1 | * | 8/2005 | Cook ............ 523/210 |

OTHER PUBLICATIONS

A. Kumar and L.D. Stephenson, Smart coatings, 23rd Army Science Conference, Orlando, FL, Dec. 2002, www.asc2002.com/summaries/a/AP-16.pdf.

M. Kendig, "Past, Present and Future 'Smart' Protective Coatings," *Conference Advanced Research & Development of Coatings for Corrosion Protection: Offshore Oil & Gas Operations Facilities, Marine Pipeline & Ship Structures*, Apr. 14-16, 2004, Biloxi, MS, Organized by Colorado School of Mines.

H. Yang and W. vanOoij, Plasmas and Polymers, 8(4): 297-323 Dec. 2003.

M. Kedig et al., *Progress In Organic Coatings*, "Smart Corrosion Inhibiting Coatings," 47, 183 (2003).

\* cited by examiner

*Primary Examiner*—Timothy H Meeks
*Assistant Examiner*—Mandy C Louie
(74) *Attorney, Agent, or Firm*—Randall M. Heald

(57) ABSTRACT

Coatings and methods are provided. An embodiment of the coating includes microcapsules that contain at least one of a corrosion inhibitor, a film-forming compound, and an indicator. The microcapsules are dispersed in a coating vehicle. A shell of each microcapsule breaks down in the presence of an alkaline condition, resulting from corrosion.

17 Claims, 1 Drawing Sheet

COATINGS AND METHODS FOR CORROSION DETECTION AND/OR REDUCTION

STATEMENT OF GOVERNMENT INTEREST

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title."

TECHNICAL FIELD OF THE INVENTION

The present invention relates generally to corrosion and in particular the present invention relates to coatings and methods for corrosion detection and/or reduction.

BACKGROUND OF THE INVENTION

Metals and metal alloys are present in some shape or form in nearly every facet of our lives. Many metals and metal alloys are subject to corrosion that causes these metals and metal alloys to lose their structural integrity.

SUMMARY

The above-mentioned problems with metals and metal alloys and other problems are addressed by the present invention and will be understood by reading and studying the following specification.

For one embodiment, the invention provides a corrosion detection method, including applying a coating on a metal surface, the coating having microcapsules dispersed in a coating vehicle, the microcapsules containing an indicator, releasing the indicator in the presence of corrosion, and indicating the presence of the corrosion using the indicator, where releasing the indicator is caused by an alkaline condition, resulting from the corrosion, that breaks down shells of microcapsules exposed to the alkaline condition.

Further embodiments of the invention include methods and apparatus of varying scope.

DETAILED DESCRIPTION

Figure 1:
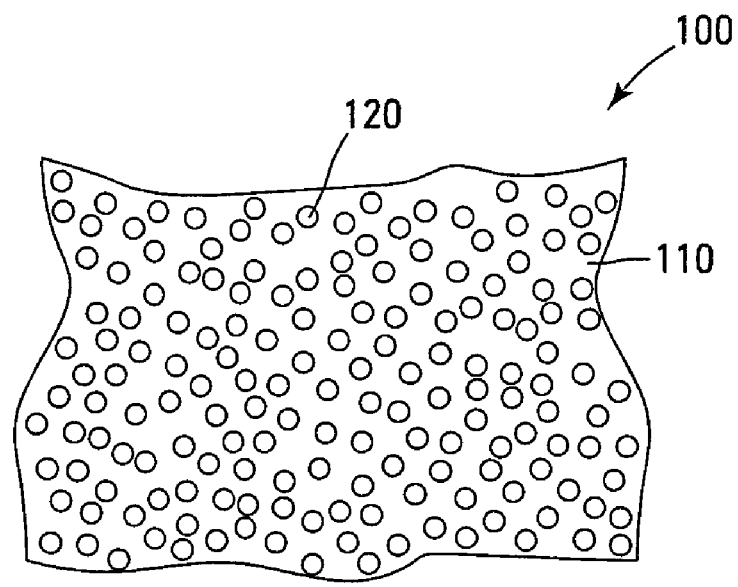
FIG. 1 illustrates an embodiment of a coating, according to an embodiment of the invention.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and chemical changes may be made without departing from the scope of the present invention. The following detailed description is, therefore, not to be taken in a limiting sense, and the scope of the present invention is defined only by the appended claims and equivalents thereof.

FIG. 1 illustrates a coating 100, according to an embodiment. Coating 100 includes a coating vehicle 110, such as clear or opaque paint, aqueous gel, water, etc., having microcapsules 120 dispersed within the coating vehicle 110, e.g., by mixing etc. For embodiments including the aqueous gel, coating 100 is a temporary coating. For another embodiment, coating vehicle 110 may be a solvent, such as an aliphatic hydrocarbon, e.g., aliphatic petroleum distillates.

Figure 2:
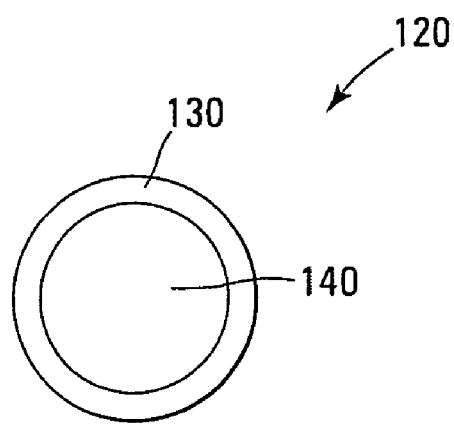
FIG. 2 illustrates an embodiment of a microcapsule, according to another embodiment of the invention.

FIG. 2 is an enlarged view of a microcapsule 120, according to another embodiment. Microcapsule 120 includes a shell 130 that contains an encapsulant 140, such as a film-forming compound, an indicator, or a corrosion inhibitor, or various combinations thereof. A suitable film-forming compound may be a clear varnish, such as an acrylic varnish. A suitable indicator may be a pH indicator that changes color over the alkaline region, e.g., pHs from about 8 to about 10, such as phenolphthalein. Another suitable indicator is one that fluoresces, such as 7-hydroxycoumarin or coumarin, in the presence of or upon the oxidation of a metal or in the presence or upon the formation of a metal cation complex. A suitable corrosion inhibitor may be, sodium nitrate, camphor, polyamine fatty acid salts in a solvent, such as toluene, vegetable oil, or the like.

Shell 130 is broken down or disintegrates in the presence of a base (or an alkaline), e.g., having a pH above about 8, for releasing encapsulant 140. Microcapsules having shells that break down under basic, or alkaline, conditions are known in the art. For example, a microcapsule 120 may be formed by forming an oil, e.g., toluene, vegetable oil, in water emulsion. A surfactant, such as xanthan gum, Attagel 40 (available from Engelhard Corporation, Iselin, N.J., USA), Petro BAF (available from Akzo Nobel Chemicals, Inc., Chicago, Ill., USA), and/or Reax 83 (available from MeadWestvaco Corporation, Stamford, Conn., USA) is added to the emulsion to evenly distribute the oil in the water. A pre-polymer, such as an amino resin pre-polymer, a cross-linking agent having one or more ester or thioester groups that are broken down under basic conditions, and encapsulant 140 are added to the oil phase. A catalyst, such as an inorganic acid, is added to the water phase. The oil in water emulsion is heated, causing a polymerization reaction to occur at the water-oil interface, which forms shell 130 around encapsulant 140. It is the interaction of alkaline conditions with functional groups of the cross-linking agent that causes shell 130 to break down under alkaline conditions. Alternatively, encapsulant 140 can be released mechanically, such as by scratching or compressing a surface to which coating 100 is applied.

A basic, or alkaline, condition often forms in the presence of corrosion in a metal or a metal alloy, e.g., a basic condition often forms next to corrosion-induced pits, crevices, etc. For example, as is known in the art, when a drop of salt water is applied to steel, an anodic reaction occurs to produce a rust spot, and a cathodic reaction, e.g., involving water and oxygen, occurs to produce a basic condition. Therefore, when coating 100 is applied to a metal surface, and if there is corrosion, shells 130 of the microcapsules 120 exposed to the base condition will break down under the basic condition resulting from the corrosion, thereby releasing encapsulant 140. Hereinafter, corrosion will refer to any chemical or electrochemical process involving the deterioration or degradation of metals, including pitting, crevice corrosion, or the like.

For one embodiment, coating 100 is temporarily applied to a metal-containing surface, e.g., by spraying, brushing, or rolling, to determine whether corrosion has occurred. For this embodiment, coating vehicle 110 is an aqueous gel, and encapsulant 140 includes a suitable indicator, such as the pH indicator or the florescent indicator, as described above. In the presence of corrosion, the shells 130 of the microcapsules 120 break down, releasing the indicator. The pH indicator will change color or the florescent indicator will fluoresce to indicate the presence of corrosion. Coating vehicle 110 is not limited to an aqueous gel, but can be a clear paint or varnish, opaque paint or varnish, etc. that is substantially permanently applied to the metal-containing surface by spraying, brushing, or rolling. For another embodiment, coating 100 is applied substantially permanently to a bare metal surface as a primer coat that is clear coated. Another example of a temporary coating is a water suspension of microcapsules 120. Examples of a metal-containing surface include a bare metal surface, a metal surface coated with, e.g., paint, varnish, epoxy, etc., a metal coated with a previous application of coating 100, or the like. Other examples of a metal-containing surface include metal or metal alloy, e.g., a ferrous metal or alloy.

For some embodiments, e.g., where coating 100 is substantially permanently applied, encapsulant 140 may include the indicator or the corrosion inhibitor or both. If corrosion occurs, encapsulant 140, due to shells 130 breaking down in the presence of the basic condition resulting from the corrosion, is released, and the corrosion inhibitor acts to prevent further corrosion, while the indicator indicates the corrosion location. For another embodiment, a trauma, such as a scratch, an impact, etc., to coating 100 may act to expose metal. The trauma can also break shells 130 so as to release corrosion inhibitor that acts to reduce the likelihood of the exposed metal of corroding.

For another embodiment, e.g., where coating 100 is substantially permanently applied, encapsulant 140 may include the film-forming compound, the film-forming compound and corrosion inhibitor, the film-forming compound, corrosion inhibitor, and indicator, or the film-forming compound and the indicator. For one embodiment, if coating 100 is exposed to trauma that causes shells 130 to break, the film-forming compound forms over at least a portion of the trauma and acts to reduce the likelihood of any exposed metal of corroding. For some embodiments, the corrosion inhibitor acts further reduce the likelihood of corrosion of any exposed metal.

Note that if corrosion occurs at locations away from the trauma location, e.g., due to small breaks in the coating, such as chips, or adjacent the trauma location, corrosion inhibitor and film-forming compound will be released due to shells 130 breaking down in the presence of the basic condition, resulting from the corrosion. In other embodiments, the indicator will indicate the presence of the corrosion.

For one embodiment, a portion of microcapsules 120 in coating 100 contains corrosion inhibitor and another portion of microcapsules 120 in coating 100 contains indicator. For another embodiment, a portion of microcapsules 120 in coating 100 contains corrosion inhibitor, another portion of microcapsules 120 in coating 100 contains indicator, and yet another portion of microcapsules 120 in coating 100 contains film-forming compound. For another embodiment, a portion of microcapsules 120 in coating 100 contains film-forming compound and another portion of microcapsules 120 in coating 100 contains indicator. For some embodiments, microcapsules 120 having different contents are randomly distributed within coating vehicle 110 so that microcapsules 120 having the different functions of indicating, inhibiting, and/or film-forming may be adjacent each other, as well as microcapsules 120 having like functions being adjacent each other.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A corrosion detection method, comprising:
    applying a coating on a metal-containing surface, the coating comprising microcapsules dispersed in a coating vehicle, the microcapsules comprising shells encapsulating an indicator;
    breaking down the shells by interaction of the shells and an alkaline condition naturally occurring in the presence of corrosion; and
    releasing the indicator.

2. The detection method of claim 1, wherein indicating the presence of corrosion using the indicator comprises the indicator changing color in response to the alkaline condition.

3. The detection method of claim 1, wherein indicating the presence of corrosion using the indicator comprises the indicator fluorescing in response to the alkaline condition.

4. The detection method of claim 1, wherein the coating vehicle is selected from the group consisting of clear paint, clear varnish, opaque varnish, opaque paint, water, solvents, and aqueous gel.

5. A method of treating of a surface, comprising:
    applying a coating to the surface, wherein the coating comprises microcapsule shells dispersed in a coating vehicle, the microcapsule shells containing a corrosion inhibitor;
    breaking down the microcapsule shells through interaction of the shells and an alkaline condition naturally occurring in the presence of corrosion; and
    releasing the corrosion inhibitor.

6. The method of claim 5, wherein the microcapsules further contain an indicator for indicating the presence of corrosion.

7. The method of claim 6, wherein the indicator changes color in the presence of the alkaline condition or fluoresces in the presence of the corrosion.

8. The method of claim 5, wherein the coating vehicle is selected from the group consisting of clear paint, clear varnish, opaque varnish, and opaque paint.

9. The method of claim 5, wherein the microcapsules containing the corrosion inhibitor are first microcapsules, and further comprising releasing an indicator from second microcapsules in response to these second microcapsules being exposed to the alkaline condition.

10. A method, comprising:
    applying a coating to a metal-containing surface;
    wherein the coating comprises first microcapsules dispersed in a coating vehicle, each first microcapsule comprising a first encapsulant contained in a first shell;
    wherein the first shells break down in an alkaline condition that naturally occurs in the presence of corrosion to release the first encapsulant; and wherein the first encapsulant includes at least one material selected from the group consisting of corrosion indicators, corrosion inhibitors, and film-forming compounds.

11. The method of claim 10 further comprises:
wherein the coating further comprises second microcapsules dispersed in the coating vehicle, each second microcapsule comprising a second encapsulant contained in a second shell;
wherein the second shells break down in an alkaline condition that naturally occurs in the presence of corrosion to release the second encapsulant; and
wherein the second encapsulant is of a different composition than the first encapsulant and includes at least one material selected from the group consisting of corrosion indicators, corrosion inhibitors, and film-forming compounds.

12. The method of claim 10 further comprises:
wherein the coating further comprises second microcapsules dispersed in the coating vehicle, each second microcapsule comprising a second encapsulant contained in a second shell;
wherein the second shells break down in an alkaline condition that naturally occurs in the presence of corrosion to release the second encapsulant; and
wherein the first encapsulant contains a corrosion indicator and the second encapsulant contains a corrosion inhibitor or a film-forming compound or both.

13. The method of claim 10, wherein the metal-containing surface is a bare metal surface or a coated metal surface.

14. The method of claim 10, wherein the metal-containing surface comprises a metal or metal alloy.

15. The method of claim 10 further comprises:
wherein the coating further comprises second microcapsules dispersed in the coating vehicle, each second microcapsule comprising a second encapsulant contained in a second shell;
wherein the second shells break down in an alkaline condition that naturally occurs in the presence of corrosion to release the second encapsulant; and
wherein the first and second shells are the same material.

16. The method of claim 10, wherein the shells break down at pH values of about 8 or above.

17. The method of claim 10, further comprises indicating a presence corrosion or protecting against corrosion or both.

* * * * *